US010505937B2

(12) United States Patent
Norris et al.

(10) Patent No.: US 10,505,937 B2
(45) Date of Patent: Dec. 10, 2019

(54) SYSTEM AND METHOD FOR APPLICATION ROUTE MANAGEMENT

(71) Applicant: ServiceNow, Inc., Santa Clara, CA (US)

(72) Inventors: Jeremy Norris, San Diego, CA (US); Antony Chan, San Diego, CA (US); Siddharth Shah, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 157 days.

(21) Appl. No.: 15/421,734

(22) Filed: Feb. 1, 2017

(65) Prior Publication Data

US 2018/0219866 A1 Aug. 2, 2018

(51) Int. Cl.
*G06F 21/62* (2013.01)
*H04L 29/06* (2006.01)

(52) U.S. Cl.
CPC ........ *H04L 63/101* (2013.01); *G06F 21/6218* (2013.01); *G06F 21/6227* (2013.01); *G06F 21/6236* (2013.01); *H04L 63/0876* (2013.01); *G06F 2221/2141* (2013.01); *H04L 63/107* (2013.01)

(58) Field of Classification Search
CPC ..... H04L 63/10; H04L 63/101; H04L 63/107; G06F 9/468; G06F 21/51; G06F 21/6218; G06F 2221/2141
See application file for complete search history.

(56) References Cited

U.S. PATENT DOCUMENTS

| 6,957,274 | B2 | 10/2005 | Trace et al. |
| 7,165,152 | B2* | 1/2007 | Blumenau ............... G06F 9/468 |
| | | | 711/147 |
| 7,441,262 | B2 | 10/2008 | Hui et al. |
| 8,090,827 | B2 | 1/2012 | Hoover et al. |
| 8,189,587 | B2 | 5/2012 | Masputra et al. |
| 8,352,596 | B2 | 1/2013 | Yamaguchi et al. |

(Continued)

OTHER PUBLICATIONS

Oracle.com, "Enabling Access to a Compute Node Port", Using Oracle Database Cloud Service, https://docs.oracle.com/en/cloud/paas/database-dbaas-cloud/csdbi/enable-access-port.html#CSDB13494, Date Unknown, downloaded Dec. 27, 2016, 2 pp.

(Continued)

*Primary Examiner* — Daniel B Potratz
*Assistant Examiner* — D'Arcy Winston Straub
(74) *Attorney, Agent, or Firm* — Fletcher Yoder PC

(57) ABSTRACT

The unauthorized access of database nodes by application nodes within an electronic computing and communications system can be prevented using an access table that stores access table records indicating that at least some of the application nodes are authorized to access at least some of the database nodes. The access table records can be generated by identifying connections between application nodes and database nodes within a configuration management database. Responsive to receiving a request to access a database node sent from a first application node, the access table can be queried to determine whether an access table record indicating that the first application node is authorized to access the database node is stored in the access table. If that access table record is not stored in the access table, the request is denied. Otherwise, the request is allowed.

20 Claims, 7 Drawing Sheets

(56) References Cited

U.S. PATENT DOCUMENTS

| | | | |
|---|---|---|---|
| 8,560,684 B2 | 10/2013 | Ernst | |
| 8,590,032 B2 | 11/2013 | Hopen et al. | |
| 8,613,041 B2 | 12/2013 | Hopen et al. | |
| 9,276,942 B2* | 3/2016 | Srinivasan | G06Q 10/06315 |
| 2001/0020254 A1 | 6/2001 | Blumenau et al. | |
| 2004/0243851 A1* | 12/2004 | Lee | H04L 63/101 |
| | | | 726/4 |
| 2017/0118219 A1* | 4/2017 | Nguyen | H04L 63/102 |

OTHER PUBLICATIONS

1Dffice Action for Canadian Application No. 2989591 dated 17 Sep. 2018; 4 pgs.

* cited by examiner

SYSTEM AND METHOD FOR APPLICATION ROUTE MANAGEMENT

TECHNICAL FIELD

This disclosure relates in general to application route management.

BACKGROUND

An electronic computing and communications system can include one or more communicating and computing elements, which can, in the course of communicating and computing, process information using nodes operating on servers at a datacenter. The nodes may include application nodes and database nodes. The application nodes can execute application software usable by clients connecting to a server. The database nodes can store data usable by the application software. The execution of application software by an application node can include requesting access to a database node.

SUMMARY

Disclosed herein are implementations of systems and techniques for application route management.

In an implementation, a system is provided for preventing unauthorized access of database nodes by application nodes within an electronic computing and communications system. The system comprises a memory and a processor. The memory is configured to store data in a configuration management database (CMDB) and one or more processor-executable routines. The processor is configured to communicate with the memory and to execute the routines stored therein. The routines, when executed, cause the system to generate, based on information stored in the CMDB, access table records indicating that at least some of the application nodes of the application nodes are authorized to access at least some of the database nodes of the database nodes. The routines, when executed, further cause the system to store the access table records within an access table. The routines, when executed, further cause the system to receive a request to access a database node, wherein the request is sent from a first application node. The routines, when executed, further cause the system to determine that an access table record indicating that the first application node is authorized to access the database node is not stored in the access table. The routines, when executed, further cause the system to deny the request responsive to the determination.

In an implementation, a method is provided for preventing unauthorized access of database nodes by application nodes within an electronic computing and communications system. The method comprises generating, based on information stored in a configuration management database (CMDB), access table records indicating that at least some of the application nodes of the application nodes are authorized to access at least some of the database nodes of the database nodes. The method further comprises storing the access table records within an access table. The method further comprises receiving a request to access a database node, wherein the request is sent from a first application node. The method further comprises determining that an access table record indicating that the first application node is authorized to access the database node is not stored in the access table. The method further comprises denying the request responsive to the determination.

In an implementation, a non-transitory computer-readable storage medium is provided comprising processor-executable routines that, when executed by a processor, facilitate a performance of operations for preventing unauthorized access of database nodes by application nodes within an electronic computing and communications system. The operations comprise identifying a connection between a first application node of the application nodes and a database node of the database nodes within a configuration management database (CMDB), wherein the CMDB includes configuration items corresponding to the database nodes and the application nodes. The operations further comprise configuring an access table to allow the first application node to access the database node responsive to a request to access the database node sent from the first application node, wherein the access table is configured to deny requests to access the database node by default. The operations further comprise accessing, by the first application node, the database node responsive to receiving the request from the first application node and allowing the request by the access table.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
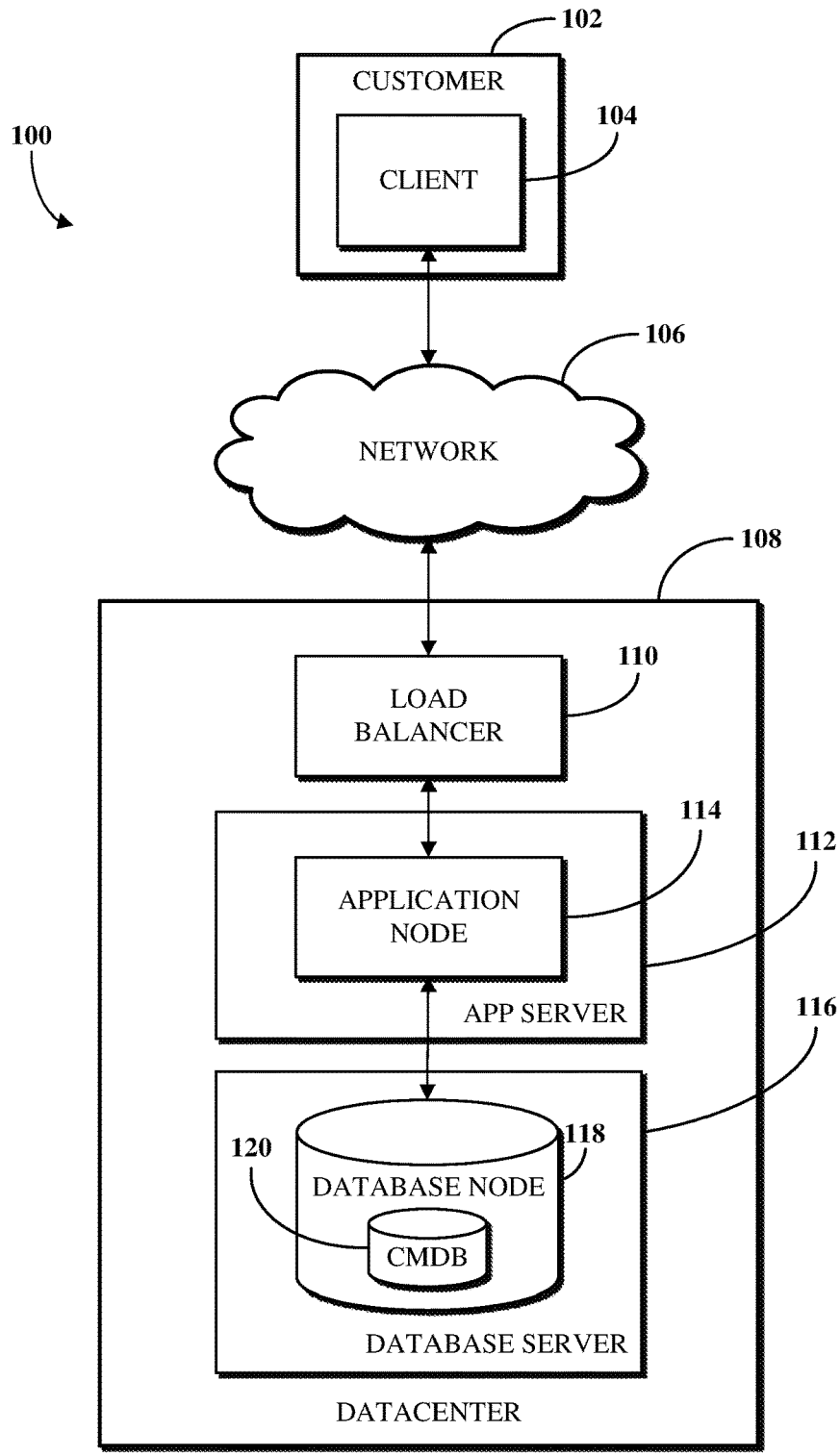
FIG. 1 is a block diagram of an example of an electronic computing and communications system.

Customers of a computing (e.g., Platform-as-a-Service (PaaS)) provider can develop application software such as by using configurable platform software. The application software executes on application nodes operating on a server, which server operates at a datacenter controlled by the PaaS provider. A database node operating on the same or a different server stores data accessible by the application nodes. In some cases, such as in single-tenant environments where a PaaS provider supports multiple customers, the data stored in a database node is particularized to the individual customer that uses the database node. As such, an application node associated with a first customer should not be able to access a database node of a second customer. Similarly, an application node of the second customer should not be able to access a database node of the first customer.

The accessibility of a database node can be controlled using a security mechanism, such as the MySQL authentication mechanism. For example, such a security mechanism can verify the credentials (e.g., username and password data) of an application node that requests access to the database node before allowing the application node to access the database node. However, such security mechanisms may still permit access to database nodes by unauthorized application nodes, such as where the credentials of an authorized application node are intercepted. For example, a customer may gain access to the mysql.user table, which stores data indicative of the components of an electronic computing and communications system that are authorized to access a database node operating a MySQL instance. The customer may use the data stored in the mysql.user table to access the database node even where its own application nodes are not authorized to do so.

Implementations of this disclosure address problems such as these by configuring an access table to allow particular application nodes to access particular database nodes according to connections between those application nodes and database nodes identified within a configuration management database (CMDB). A CMDB may include records of datacenter components (e.g., application nodes, database nodes, other software executables or dependencies, or the like) that are associated with the instantiation of application software of a customer of a PaaS provider. The CMDB shows how the components connect with one another to instantiate the application software. Information indicative of these connections, such as the IP addresses and ports of connected components, is stored as access table records of the access table based on the information from the CMDB. When a request is made by a first component (e.g., an application node that executes an instance of application software) to access a second component (e.g., a database node that stores data used by the instance of application software), the access table is queried to determine whether any access table records thereof indicate a connection between the first and second components. If an access table record indicates such a connection, the request is allowed. The access table is configured to deny requests by default such that, if no entry of the access table indicates a connection between the first and second components, the request is denied.

Implementations of this disclosure provide technological improvements particular to computer networks, for example, those concerning the allowing or denying of requests by components of an electronic computing and communications system to access other components thereof. Computer network-specific technological problems, such as preventing unauthorized access to database nodes or other components, can be wholly or partially solved by implementations of this disclosure. For example, information stored in a CMDB about the components that are authorized to connect to one another may be leveraged for configuring an access table. The access table may be consulted upon a request to access a component being sent from another component. Implementations of this disclosure can thus introduce new and efficient improvements in the ways in which requests to access components of an electronic computing and communications system are allowed by adding an additional layer of security on top of existing authentication mechanisms, such as by requiring that authorized connections be indicated based on known communications between IP addresses and ports of the components.

Figure 2:
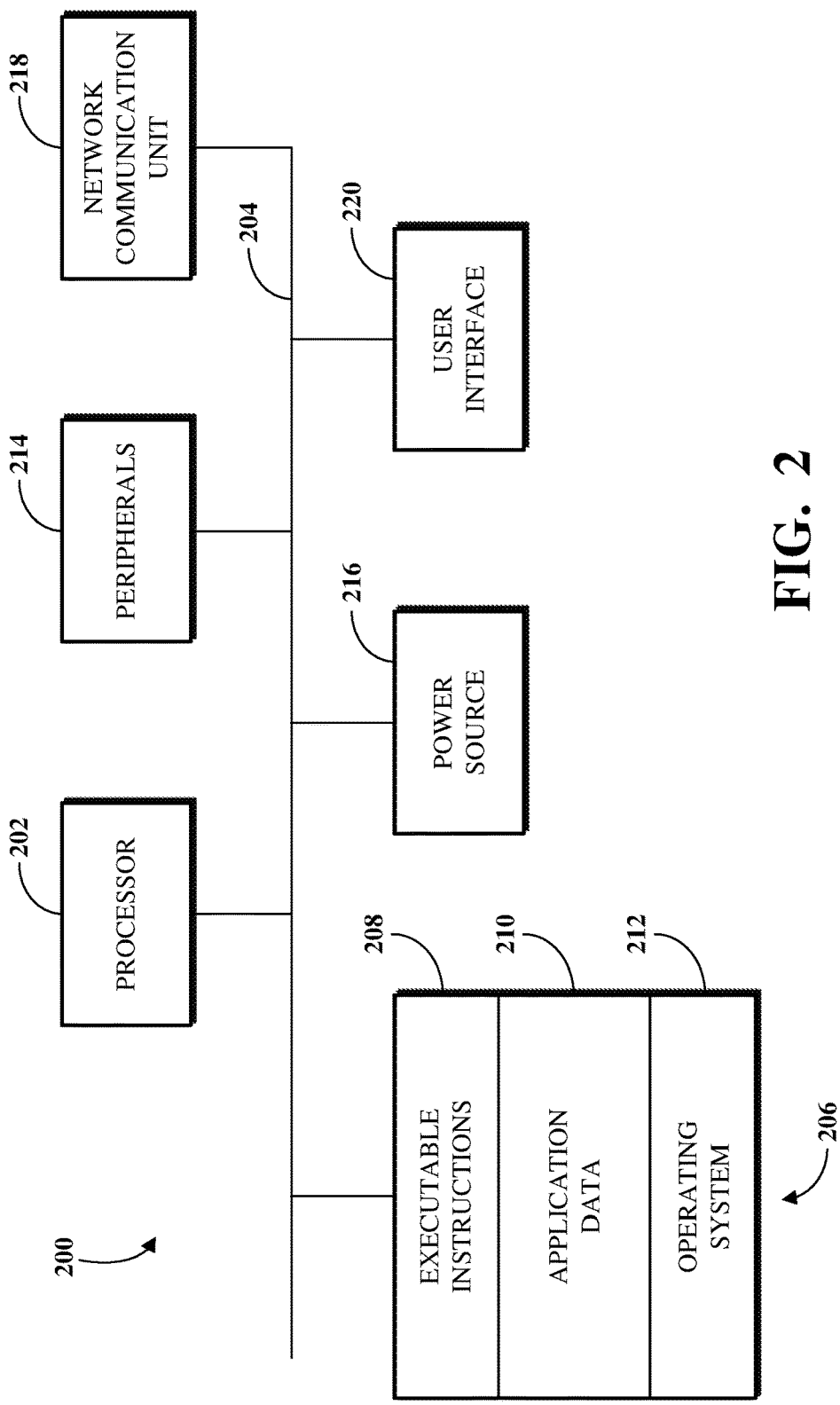
FIG. 2 is a block diagram of an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing. The terms "database" and "database node" may be interchangeably used herein to refer to a data structure for storing data associated with software, such as application software executing on one or more application nodes.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database node, such as the database node 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database node 118, which can be accessible by software executed on the application node 114. The database 118 node may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database node 118 can be configured as or comprise any suitable database type. Further, the system 100 can include one, two, three, or any suitable number of database nodes configured as or comprising any suitable database type or combination thereof.

In some implementations, the database node 118 can be configured as or comprise a CMDB 120. The CMDB 120 can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB 120 by a CI.

The CMDB 120 can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more database nodes (e.g., the database node 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, an access table configured to allow or deny requests to access components of the system 100 can be implemented on the application server 112, the database server 116, or the load balancer 110. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within an electronic computing and communications system. A load balancer associated with an electronic computing and communications system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, an electronic computing and communications system can include distinct routing units, load balancing units, firewall units, or the like.

The primary datacenter can include a primary database node, such as the database node 118, and the secondary datacenter can include a secondary database node. The secondary database node can include an exact or substantially exact mirror, copy, or replication of the primary database node. The primary database node or the secondary database node can be implemented as an RDBMS, an object database, an XML database, one or more flat files, or the like.

An application node implemented within a distributed computing environment can connect to or communicate with the primary database node, which can be associated with the datacenter with which the application node is associated, or associated with another datacenter. For example, a primary datacenter can include a primary database node and a first set of application nodes. A secondary datacenter can include a secondary database node and a second set of application nodes. The application nodes of the first and second sets can provide a software service to remote clients, and can read or write data in the primary database node. The secondary database node can mirror changes made to the primary database node and prevent write operations from being performed directly on the secondary database node. In the event that a failover condition associated with the primary database node is identified, the secondary database node can operate as the primary database node and can allow read or write access to data. The primary database node can then operate as the secondary database node, mirror the new primary database node, and prevent direct write access to the new secondary database node.

An electronic computing and communications system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In an electronic computing and communications system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate access table records indicating that at least some of the application nodes within an electronic computing and communications system (e.g., the system 100 shown in FIG. 1) are authorized to access at least some of the database nodes of the electronic computing and communications system, store the access table records in an access table, receive a request to access a database node sent from an application node, determine that the access table does not include an access table record indicating that the application node is authorized to access the database node, and deny the request responsive to a determination that the access table does not include such an access table record.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
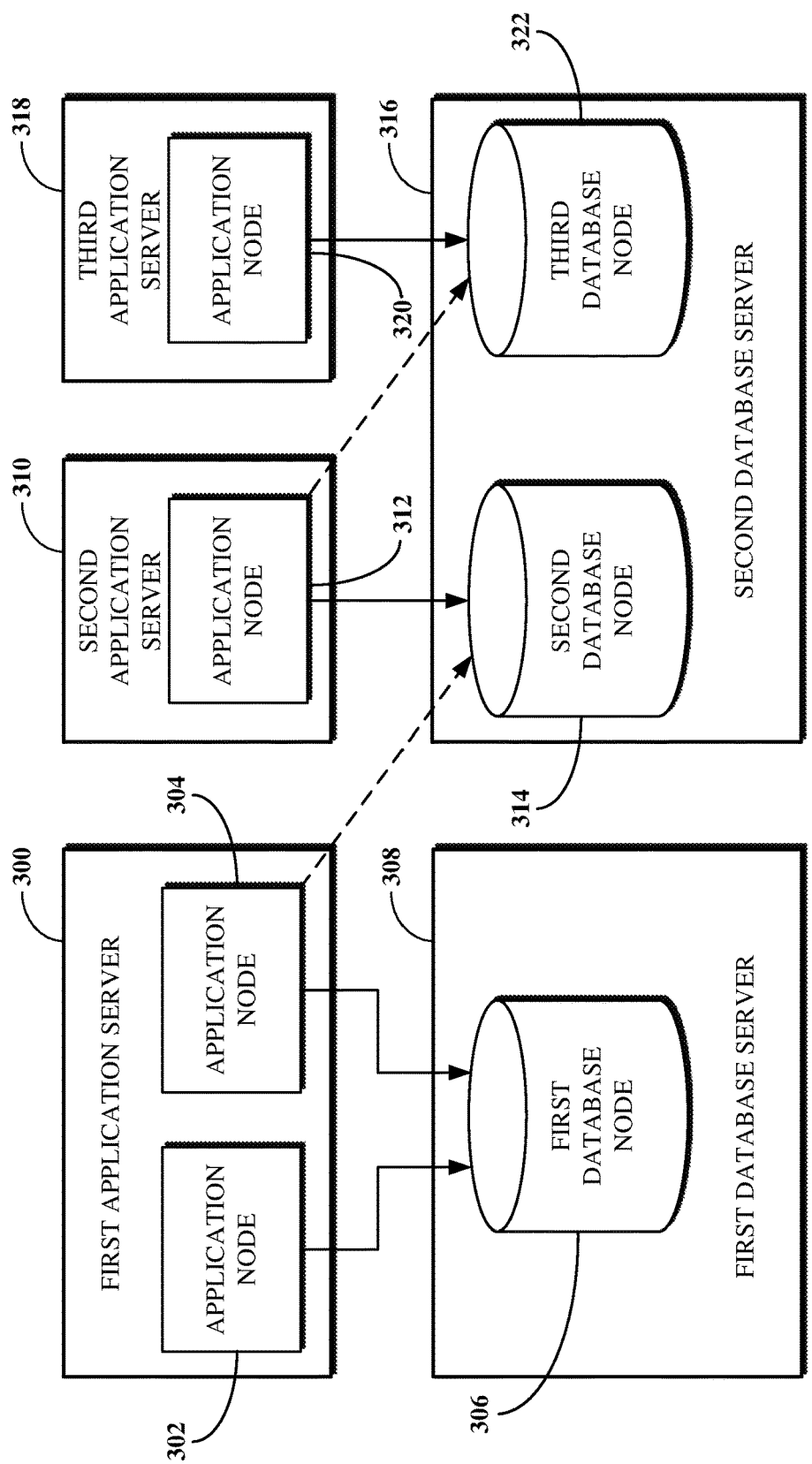
FIG. 3 is a block diagram of examples of connections between application nodes and database nodes within an electronic computing and communications system.

FIG. 3 is a block diagram of examples of connections between application nodes 302, 304, 312, and 320 and database nodes 306, 314, and 322 within an electronic computing and communications system, such as the system 100 shown in FIG. 1. As shown in the FIG. 3, a first application server 300 includes application nodes 302 and 304 that can access a first database node 306 operating on a first database server 308. A second application server 310 includes an application node 312 that can access a second database node 314 operating on a second database server 316. A third application server 318 includes an application node 320 that can access a third database node 322 operating on the second database server 316.

The application servers 300, 310, 318 can be an application server such as the application server 112 shown in FIG.

1. The application nodes 302, 304, 312, 320 can be application nodes such as the application node 114 shown in FIG. 1. The first, second, and third database nodes 306, 314, 322 can be database nodes such as the database node 118 shown in FIG. 1. The database servers 308, 316 can be a database server such as the database server 116 shown in FIG. 1.

The application nodes 302, 304, 312, and 320 and the database nodes 306, 314, and 322 shown in FIG. 3 can be used to execute distinct instances of application software, such as platform software. For example, in a single-tenant PaaS environment, a first instance of platform software can be instantiated by the application nodes 302 and 304 and the first database node 306, a second instance of platform software can be instantiated by the application node 312 and the second database node 314, and a third instance of platform software can be instantiated by the application node 318 and the third database node 322. The different instances of platform software can be instantiated for different customers of a PaaS provider, such that a customer can access its instance of the platform software by communicating with an application server executing the instance. The application nodes 302 and 304 can be said to have the same instance of platform software, for example, because they may operate the same version of platform software and may access the same database node. However, the application nodes 302 and 304 can execute different copies of the platform software. Implementations of application nodes, database nodes, and platform software instances different than as described here may be available and may be configured differently or include additional or fewer nodes or platform software instances.

The database nodes accessible by separate customers may comprise the same or different structural elements (e.g., database schema or other elements for defining the tables, columns, rows, and other logical structures of the database nodes). The database nodes may further comprise the same or different catalogs (e.g., the values of database fields stored in the tables, columns, rows, and other logical structures of the database nodes). However, it is likely that even if the database nodes associated with different customers share common structural elements, they most likely do not have the same catalogs. As shown in FIG. 3, some database nodes, such as the second and third database nodes 314, 322, may operate on a common database server (e.g., the second database server 316) even though the database nodes themselves are not accessible by other customers. Alternatively, each customer's database node may operate on a different database server.

For example, the first instance of platform software can be associated with a first customer, the second instance of platform software can be associated with a second customer, and the third instance of platform software can be associated with a third customer. As such, a client device of the first customer can be used to generate a request for data stored in the first database node 306 because the first database node 306 is accessible by the application nodes 302, 304 of the first instance of platform software. Similarly, a client device of the second customer can be used to generate a request for data stored in the second database node 314, and a client device of the third customer can be used to generate a request for data stored in the third database node 322.

As used herein, a request for data stored in a database node can be a direct request from a user of a client device to retrieve data from a database or an indirect request to retrieve data from a database node. For example, an indirect request can be one where the actual commands received from the client device include a request to execute further instructions by an application node.

Even though the first customer should only be able to access the first database node 306, the second customer should only be able to access the second database node 314, and the third customer should only be able to access the third database node 322, situations may arise where one of the customers intentionally or unintentionally gains access to a database that it should not be able to access. For example, a request can be sent from an application node by a custom program (e.g., JavaScript used to configure an instance of platform software) executed by the application node. The custom program can, without limitation, be a workflow expression, script, business logic, or other instruction configured by or on behalf of a customer associated with the application node on which the custom program executes. The custom program may, for example, exploit a software vulnerability to send a request to access a database node not associated with that customer's instance of platform software. For example, as represented by the dashed lines in FIG. 3, the application node 304 could take advantage of a software exploit to send a request to access the second database node 314, or the application node 312 can execute a custom program that sends a request to access the third database node 322.

Implementations of the application nodes 302, 304, 312, and 320 and the database nodes 306, 314, and 322 of FIG. 3 can include additional, less, or combined functionality as compared to that described above, or functionality other than that described above, or combinations thereof. In some implementations, each of the first application server 300, the second application server 310, the third application server 318, the first database server 308, and the second database server 316 can operate at a same datacenter. In some implementations, the first application server 300 and the first database server 308 can operate in different datacenters. For example, an application node 302, 304 of the first application server 300 can operate in a first datacenter and the first database node 306 of first database server 308 can operate in a second datacenter. A request sent from the application node 302, 304 to access the first database node 306 can thus be sent from the first datacenter to the second datacenter, such as via a load balancer (e.g., the load balancer 110 shown in FIG. 1). In some implementations, the first application server 300 and the first database server 308 can operate in a first datacenter whereas the second and third application servers 310, 318 and the second database server 316 can operate in a second datacenter.

Figure 4:
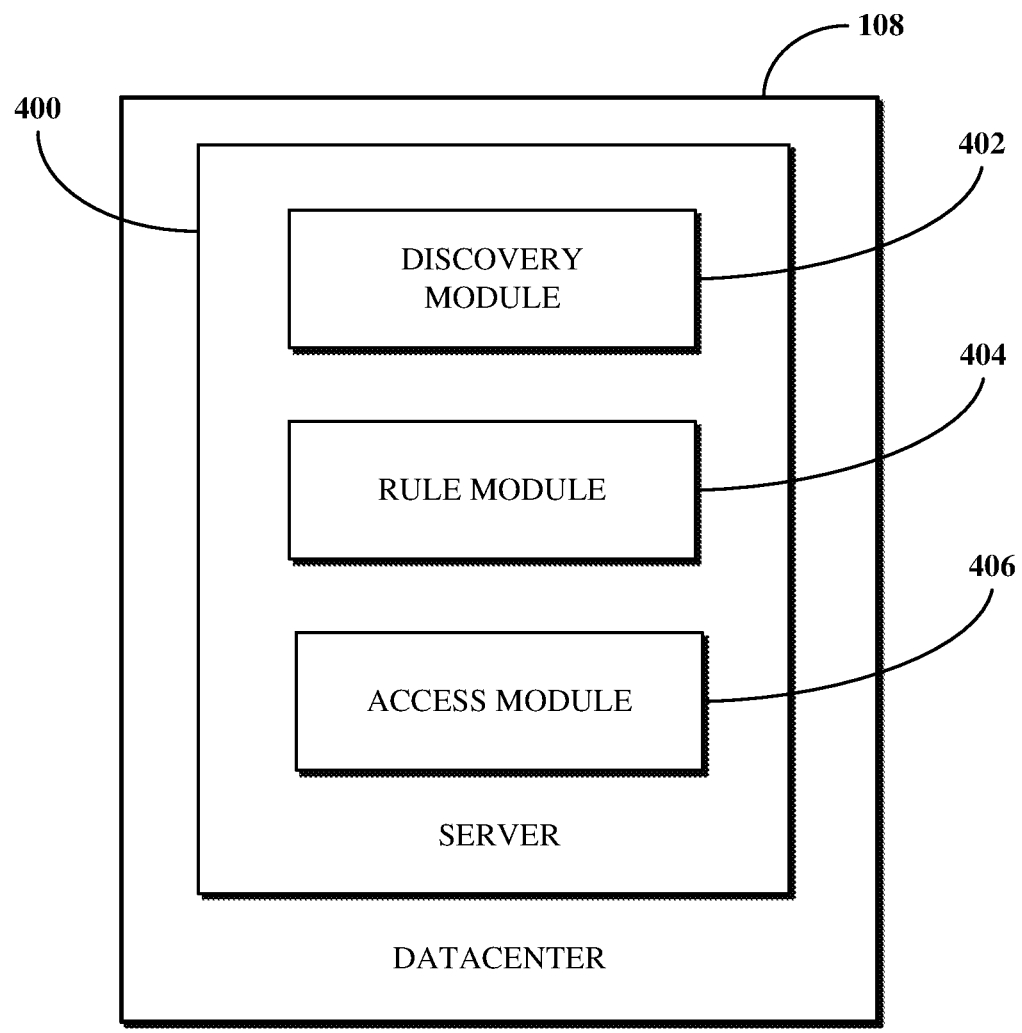
FIG. 4 is a block diagram of an example of modules for route management executing on a server at a datacenter.

FIG. 4 is a block diagram of an example of modules for route management executing on a server 400 at a datacenter, such as the datacenter 108 shown in FIG. 1. The modules can be or otherwise include instructions executable by a processor of the server 400. The server 400 can be a hardware component, such as a physical server operating one or more application servers (e.g., the application server 112 shown in FIG. 1). Alternatively, the server 400 can be an application server operating on a physical server.

The modules include a discovery module 402, a rule module 404, and an access module 406. The discovery module 402 is configured to perform discovery operations against components of an electronic computing and communications system, such as the system 100 shown in FIG. 1, to identify those components and potential connections between them. Performing a discovery operation can include running one or more discovery probes against components of the electronic computing and communications system to gather information about those components.

The steps of a discovery probe include one or more commands that can be processed (e.g., by the discovery module 402) to identify attributes of components of the electronic computing and communications system including but not limited to attributes related to the status or configuration of those components. A discovery probe is configured to communicate with a component of the electronic computing and communications system using a compatible language or interface, such as SSH, Windows Management Instrumentation (WMI), or the like. When a step of a discovery probe is processed, the subject component can be logged into using SSH for the discovery module 402 to retrieve further attribute information about the component using the subject discovery probe, such as by executing other commands against or retrieving a file associated with the component.

The discovery module 402 can use the results of a discovery operation to populate a CMDB (e.g., the CMDB 120 shown in FIG. 1) of the electronic computing and communications system with CIs corresponding to the discovered components (or update CIs corresponding thereto, as applicable). The discovery module 402 can further populate the CMDB by connecting CIs corresponding to components that communicate with one another, as indicated by the results of a discovery operation.

The rule module 404 is configured to generate rules, which can be access table records storable in an access table for allowing or denying requests by components to access one another within the electronic computing and communications system. The rule module 404 can retrieve data stored in the CMDB (e.g., populated by the discovery module 402) to identify connections between components of the electronic computing and communications system. For example, the rule module 404 can query the CMDB for a particular IP address, which may be included in a request received within the electronic computing and communications system. The rule module 404 can identify a CI within the CMDB, which CI corresponds to the particular IP address, such that the CI can be determined to correspond to the component associated with the IP address.

The rule module 404 can then determine which components of the electronic computing and communications system are authorized to communicate with the component associated with the IP address. For example, the rule module 404 can query the CMDB for CIs connected to the CI that corresponds to the component associated with the IP address. The rule module 404 can generate an access table record (e.g., a rule) authorizing the components corresponding to those connected CIs to communicate with one another, such as based on requests to access one another.

An access table record generated by the rule module 404 can be a rule for allowing a request from a component of an electronic computing and communications system to access another component of the electronic computing and communications system, such as by authorizing the requesting component to access the requested component. For example, an access table record can indicate that an application node (requesting component) is authorized to access a database node (requested component). The access table record can be generated by identifying, within a CMDB, that a CI corresponding to the application node is connected to a CI corresponding to the database node. In another example, an access table record can indicate that an application server is authorized to access a database server. In yet another example, an access table record can indicate that a program (e.g., a batch program; a timed program; a program that executes based on a trigger; a program that executes based on the occurrence of an event; or a program executable in a real-time mode, a batch mode, or the like) executing on a computing device is authorized to access another component of the electronic computing and communications system.

The rule module 404 can store the access table records it generates within an access table associated with the electronic computing and communications system. The access table can be a routing table for storing information about the components that are authorized to access other components, the components that are prevented from accessing other components, or a combination thereof. For example, the routing table can include Internet Protocol (IP) addresses and ports indicating allowed network paths between respective components, such as based on identified connections within a CMDB. The rule module 404 can include an interface module that generates access table records based on information identified by the discovery module 402 and stores (or updates, as applicable) the access table records within the access table. For example, the interface module can use database statements to create, read, update, delete, insert, or otherwise alter the data stored within an access table.

The access module 406 is configured to determine whether to allow or deny a request received from a first component of the electronic computing and communications system, wherein the request is a request to access a second component of the electronic computing and communications system. The access module 406 can query the access table for access table records stored or otherwise updated therein (e.g., by the rule module 404) to determine the components that are authorized to access others. For example, the access module 406 can receive a request (or a notification of a received request, as applicable) from an application node to access a database node. If the access table includes an access table record indicating that the application node is authorized to access the database node, the access module 406 can allow the request; otherwise, if the access table does not include such an access table record, the access module 406 can deny the request.

As stated above, the access module 406 can execute on the server 400 operating an application server or a database server. For example, the access module 406 may be instructions executed on the server 400 outside of an application server or a database server. The access module 406 may thus be intermediary between a first component (e.g., an application node) requesting access to a second component (e.g., a database node). In another example, the access module 406 may be instructions executed by an application server operating on the server 400. The access module 406 can process requests by an application node executing on the application server to access another component of the electronic computing and communications system (e.g., a database node). In yet another example, the access module 406 may be instructions executed by a database server operating on the server 400. The access module 406 can process requests intended for a database node operating on the database server to determine whether to allow access to the database node by another component of the electronic computing and communications system (e.g., an application node).

Implementations of the modules of FIG. 4 can include additional, less, or combined functionality as compared to that described above, or functionality other than that described above, or combinations thereof. In some implementations, the access module 406 can use identified connections within a CMDB to allow or deny requests without querying an access table. For example, upon a request being sent (e.g., by an application node), or upon a request being received (e.g., by a database node), the access module 406 can determine whether access should be allowed based on the connections identified within the CMDB from a first component sending the request to a second component to which the request is directed. In some implementations, one or more of the modules shown in FIG. 4 may not be provided. For example, the discovery module 402 may include instructions for generating access table records indicative of connections it identifies within a CMDB. In such cases, the rule module 404 may be omitted.

Figure 5:
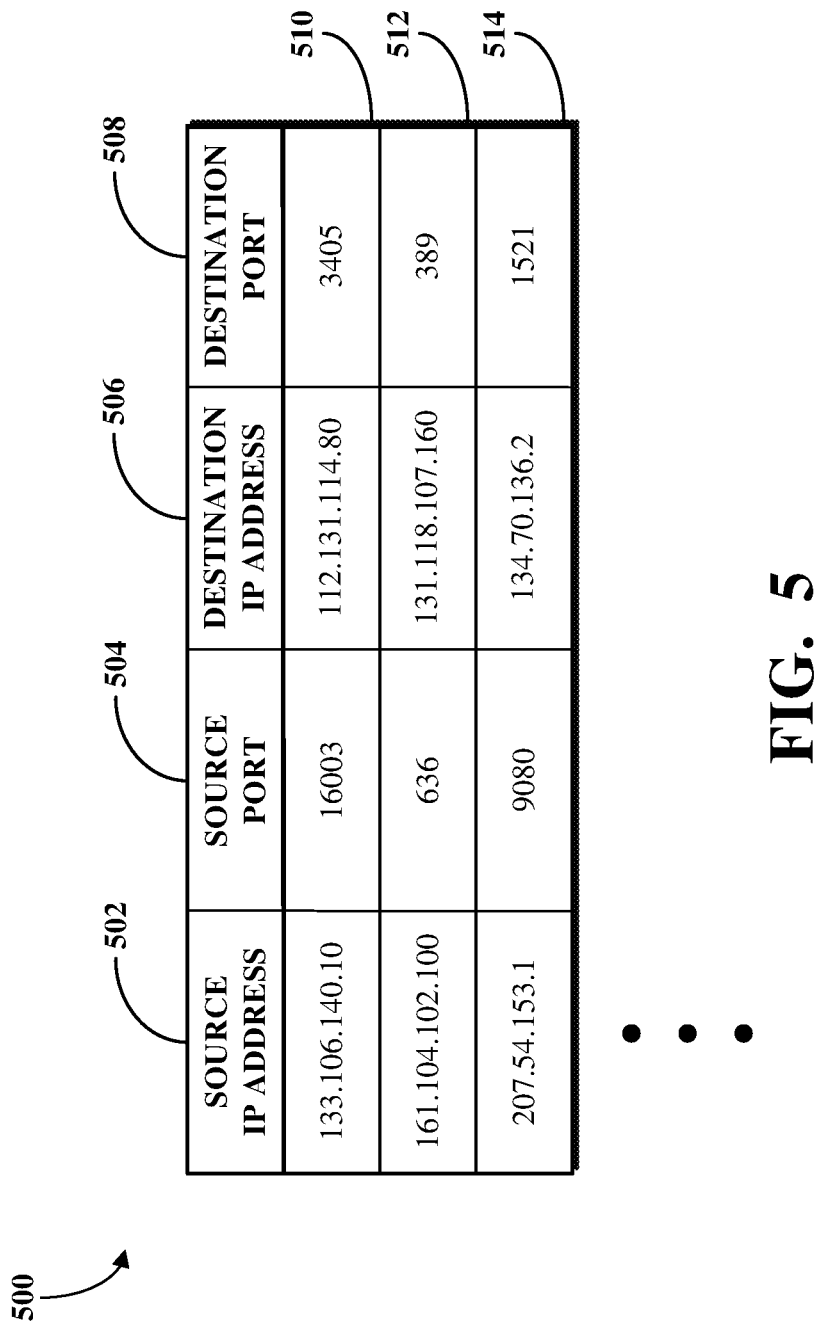
FIG. 5 is an illustration of an example of an access table storing rules indicative of allowed connections between application nodes and database nodes.

FIG. 5 is an illustration of an example of an access table 500 storing rules indicative of allowed connections between application nodes and database nodes. The access table 500 is a data structure configured to store access table records (e.g., generated by the rule module 404 shown in FIG. 4) indicative of authorized accesses of components (e.g., access between application nodes and database nodes) within an electronic computing and communications system. The access table 500 includes columns, such as a source IP address column 502, a source port column 504, a destination IP address column 506, and a destination port column 508. The access table 500 stores access table records, such as the access table records 510, 512, 514, including data values corresponding to the columns 502, 504, 506, 508.

An access table record 510, 512, 514 stored within the access table 500 includes values indicative of a source component that sends a request to access a destination component. The values include an IP address of the source component (e.g., stored in column 502), a port of the source component from which the request is sent (e.g., stored in column 504), an IP address of the destination component (e.g., stored in column 506), and a port of the destination component at which the request is received (e.g., stored in column 508). Accordingly, the access table 500 can configure access between components of an electronic computing and communications system (e.g., the electronic computing and communications system 100 shown in FIG. 1) limited to the IP addresses and ports of an access table record thereof. For example, as shown in FIG. 5, a component having the source IP address 133.106.140.10 is authorized to send a request from port 16003 to access a component having the destination IP address 112.131.114.80 at port 3405. However, the component having the source IP address 133.106.140.10 is not authorized to send a request to access a component having the destination IP address 131.118.107.160 because no access table record stored in the access table 500 indicates that connection, as shown in FIG. 5.

Implementations of the access table 500 depicted in FIG. 5 can include additional, less, or combined functionality as compared to that described above, or functionality other than that described above, or combinations thereof. In some implementations, the source port column 504 can be omitted such that an access table record stored in the access table 500 can indicate that a first component associated with source IP address can access a second component associated with a destination IP address at a destination port.

In some implementations, the access table 500 can include a column for indicating a staleness or age of the access table records stored therein. For example, the staleness or age can be indicated by an expiration timestamp or date at which the access table record will be automatically deleted from the access table 500. The expiration timestamp or date can be calculated based on a timestamp or date at which the access table record is generated or stored within the access table 500. Alternatively, a value within the staleness or age column can be updated to reflect that it has changed responsive to a subsequent discovery operation performed against a component associated with the access table record. For example, the staleness or age value can be updated as a result of a discovery operation determining that a connection between the respective components no longer exists within the CMDB.

Figure 6:
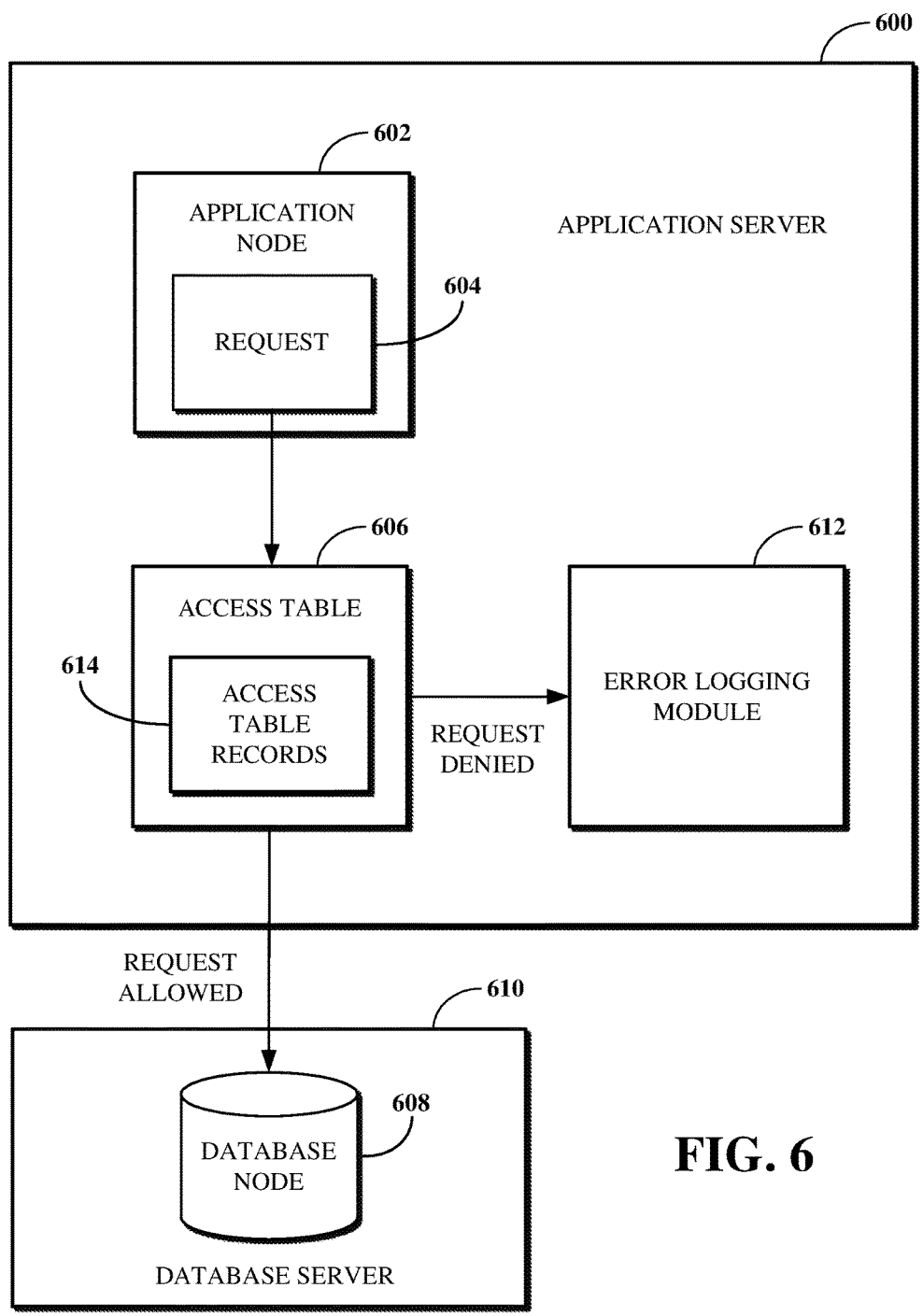
FIG. 6 is a block diagram of an example of a logic flow for allowing or denying a request from an application node to access a database node.

FIG. 6 is a block diagram of an example of a logic flow for allowing or denying a request from an application node to access a database node. The logic flow includes an application server 600 (e.g., the application server 112 shown in FIG. 1) that executes an application node 602 (e.g., the application node 114 shown in FIG. 1) from which a request 604 is sent. The application server 600 operates an access table 606 (e.g., the access table 500 shown in FIG. 5) configured to allow or deny the request 604 based on the access table records stored therein. The request can be a request to access a database node 608 (e.g., a database node such as the database node 118 shown in FIG. 1) operating on a database server 610 (e.g., the database server 116 shown in FIG. 1).

The application node 602 can execute application software, for example, an instance of platform software associated with a customer of a PaaS provider. A client device of the customer can be used to generate the request 604, such as via a client call for the application node 602 to access the database node 608. Responsive to the request 604 being generated at the application node 602, the request 604 is received by the access table 606. The access table 606 includes access table records 614 indicative of components that are authorized to access other components within the electronic computing and communications system in which the logic flow operates. For example, the access table 606 can include an access table record indicating that the application node 602 is authorized to access the database node 608. That access table record may be generated and stored in the access table 606 responsive to a connection being identified between CIs corresponding to the application node 602 and the database node 608 within a CMDB (e.g., the CMDB 120 shown in FIG. 1).

When the request 604 is received by the access table 606, the request 604 is processed to identify the IP address of a first component that sent the request, the IP address of a second component at which access is requested, and a port of the second component at which the request is to be sent. It is then determined (e.g., by software executed for managing the access table 606, such as the access module 406 shown in FIG. 4) whether the access table 606 includes an access table record that indicates that the IP address of the first component is authorized to access the IP address of the second component at the port of the second component. If the access table 606 does not include such an access table record, the request is denied. In such cases, information indicative of the request being denied can be sent to an error logging module 612 that can log the denial or report the denial, such as to an administrator of the customer associated with the component from which the request was sent. However, if the access table 606 includes such an access table record, the request is allowed such that the first component can access the second component.

Implementations of the logic flow for allowing or denying requests depicted in FIG. 6 can include additional, less, or combined functionality as compared to that described above, or functionality other than that described above, or combinations thereof. In some implementations, the request 604 can be processed to identify the source port of the first component. For example, where the access table records 614 stored in the access table 606 indicate a source port from which a requesting component (e.g., an application node) is allowed to access a requested component (e.g., a database node), the source port can be used to verify the access by the requesting component.

In some implementations, the access table 606 can be operated on the database server 608. In such cases, the request 604 from the application node 602 can be transmitted from the application server 600 to the database server 608 before a determination is made as to whether to allow or deny the request 604. In some implementations, the request 604 may be received by a load balancer (e.g., the load balancer 110 shown in FIG. 1) after it is transmitted from the application node 602. In such cases, the access table 606 can be operated on the load balancer such that the determination is made as to whether to allow or deny the request 604 after the request is transmitted from the application node 602 and before it is received by the database node 610 (to the extent the request 604 is allowed).

In some implementations, the request 604 may be transmitted from a first component other than an application node and be a request to access a second component other than a database node. For example, the first component can be a MySQL execution and the second component can be a dependency package used by the MySQL execution. The MySQL execution can request access to the dependency package, such as to install a MySQL instance on a host. The access table 606 can include a rule for permitting the MySQL execution to access the dependency package that is generated and stored within the access table 606 responsive to a discovery operation. For example, the discovery operation, when performed (e.g., by the discovery module 402 shown in FIG. 4), can cause a connection (and associated information) between the MySQL execution and the dependency package to be identified within a CMDB.

Figure 7:
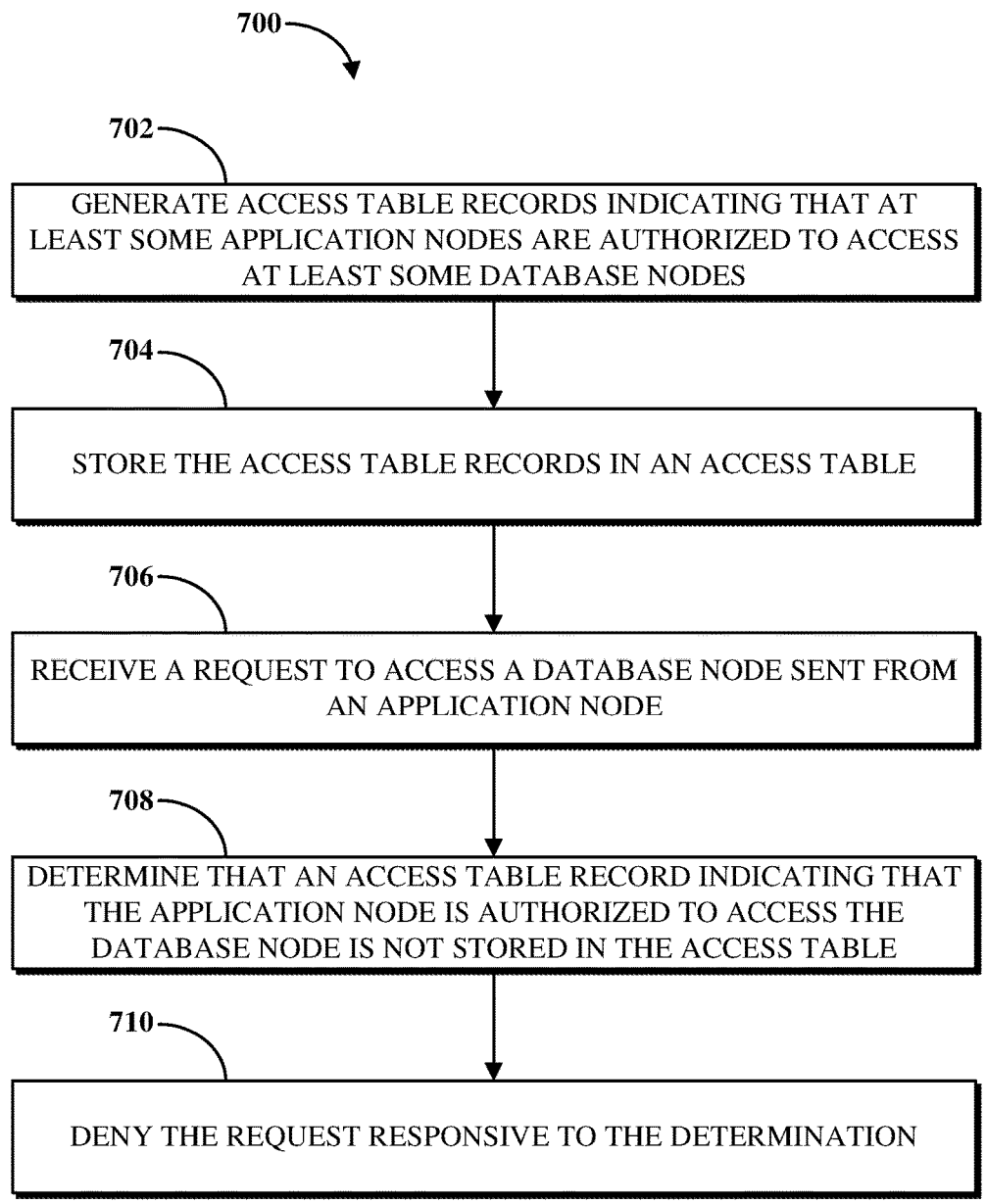
FIG. 7 is a flowchart illustrating an example of a technique for preventing unauthorized access of database nodes by application nodes.

FIG. 7 is a flowchart illustrating an example of a technique 700 for preventing unauthorized access of database nodes by application nodes. The technique 700 can be executed using computing devices, such as the systems, modules, and devices described with respect to FIGS. 1-6. The technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof.

In some implementations, the technique 700 includes generating access table records indicating that at least some application nodes are authorized to access at least some database nodes via 702, storing the access table records in an access table via 704, receiving a request to access a database node sent from a first application node via 706, determining that an access table record indicating that the first application node is authorized to access the database node is not stored in the access table via 708, and denying the request responsive to determining that the access table record is not stored in the access table via 710.

At 702, access table records are generated to indicate the components of an electronic computing and communications system that are authorized to access other components thereof. For example, the access table records may indicate respective application nodes that are authorized to access respective database nodes, such as according to the different customer instances of platform software executable within the electronic computing and communications system. The access table records can be generated based on information stored in a CMDB (e.g., the CMDB 120 shown in FIG. 1) by identifying connections between CIs within the CMDB, wherein the connected CIs correspond to a first component that is authorized to access a second component. The CMDB can be populated by one or more discovery operations performed against the components of the electronic computing and communications system.

At 704, the access table records generated at 702 are stored in the access table. The stored access table records may include IP addresses and ports of each of a first component and a second component, wherein the first component is authorized to access the second component. Storing an access table record in the access table configures the access table to allow requests sent from such a first component to access such a second component. For example, where an access table record generated at 702 indicates that a first component, such as an application node associated with a first instance of platform software, is authorized to access a second component, such as a database node associated with the first instance of platform software (e.g., which stores data used to execute the first instance of platform software), storing the access table record configures the access table to allow requests by that application node to access that database node.

At 706, a request to access one of the database nodes (e.g., a first database node) sent from one of the application nodes (e.g., a first application node) is received. The request can be received by software for managing the access table (e.g., the access module 406 shown in FIG. 4) or other instructions for processing requests to access components within an electronic computing and communications system. The request can be processed to identify an IP address of the component that sent the request (e.g., the application node), an IP address of the component for which access is requested (e.g., the database node), and a port of the component at which access is requested (e.g., of the database node). The request can also be processed to identify a port of the component that sent the request (e.g., the application node), such as where the access table is configured to store data indicative of the ports of requesting components.

At 708, a determination is made as to whether the access table includes an access table record indicating that the application node from which the request is received at 706 is authorized to access the database node. The determination can include querying the access table for the IP address and port information processed from the request at 706 such as to determine whether any access table record stored in the access table includes the same IP address and port information as is included in the request received at 706. At 710, if it is determined that the access table does not include an access table record indicating that the application node is authorized to access the database node (e.g., based on a comparison of the IP address and port information, as available, of the requesting component and the requested component and determining whether an access table record corresponding to the results of the comparison is stored in the access table, the request is denied. However, if it is determined that the access table does include an access table record indicating that the application node is authorized to access the database node, the request is allowed.

Although the technique 700 is shown as a series of operations for clarity, implementations of the technique 700 or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In some implementations, the access table records generated at 702 can be generated to indicate that at least some first components (e.g., application nodes) of an electronic computing and communications system are authorized to access at least some second components (e.g., database nodes) of the electronic computing and communications system. For example, generating the access table records can comprise identifying a connection between a first CI and a second CI of the CMDB. The first CI can correspond to a first component of the electronic computing and communications system (e.g., an application node) and the second CI can correspond to a second component (e.g., a database node) of the electronic computing and communications system. Generating the access table records can further comprise identifying an IP address and at least one port of each of the first component and the second component based on information associated with the first CI and the second CI. An access table record indicating the connection of the IP address and the at least one port of each of the first component and the second component can then be generated using this information.

In some implementations, receiving a request to access a component of the electronic computing and communications system at 706 comprises identifying, based on the request, an IP address of the first component (e.g., the application node) and an IP address and a port of the second component (e.g., the database node). In some implementations, determining whether an access table record indicating that the first application node is authorized to access the database node is stored in the access table at 708 comprises querying the access table for an access table record indicating that the IP address of the first component (e.g., the application node) is authorized to access the IP address of the second component (e.g., the database node) at the port of the second component.

In some implementations, the technique 700 further comprises performing a discovery operation to identify connections between respective ones of the first components (e.g., ones of the application nodes) and respective ones of the second components (e.g., ones of the database nodes). The CMDB referenced at 702 can be populated with CIs corresponding to at least some of the respective ones of the first components and the respective ones of the second components based on the identified connections.

An implementation includes means for generating, based on information stored in a configuration management database, access table records indicating that at least some of the application nodes are authorized to access at least some of the database nodes; means for storing the access table records within an access table; means for receiving a request to access a database node, wherein the request is sent from a first application node; means for determining that an access table record indicating that the first application node is authorized to access the database node is not stored in the access table; and means for denying the request responsive to determining that the access table record is not stored in the access table.

An implementation includes means for identifying a connection between a first application node and a database node within a configuration management database, wherein the configuration management database includes configuration items corresponding to the database nodes and the application nodes; means for configuring an access table to allow the first application node to access the database node responsive to a request to access the database node sent from the first application node, wherein the access table is configured to deny requests to access the database node by default; and means for accessing, by the first application node, the database node responsive to receiving the request from the first application node and allowing the request by the access table.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for preventing unauthorized access of database nodes by application nodes within an electronic computing and communications system, the system comprising:
   at least one memory configured to store one or more processor-executable routines; and
   at least one processor configured to communicate with the at least one memory and to execute the routines stored therein, wherein the routines, when executed, cause the system to:
      store access table records within an access table in an application server hosting the application nodes, wherein the access table records are generated based at least in part on information stored in a configuration management database (CMDB), and wherein the access table records indicate that at least some of the application nodes are authorized to access at least some of the database nodes;

receive a request to access a database node of the database nodes of a database server, wherein the request is sent from a first application node of the application nodes of the application server;

determine, in the application server, that an access table record indicating that the first application node is authorized to access the database node is not stored in the access table;

in response to determining that the access table record indicating that the first application node is authorized to access the database node is not stored in the application server, query the CMDB to determine whether an authorized connection between the first application node and the database node exists in the CMDB;

in response to the query, receive a response from the CMDB indicating that no authorized connection exists between the first application node and the database node in the CMDB;

determine that the access table record indicating that the first application node is authorized to access the database node is not stored in an updated access table based at least in part on the response from the CMDB; and in the application server, deny the request responsive to the determination that the first application node is not authorized to access the database node.

2. The system of claim 1, wherein a generation of a first access table record of the access table records is based at least in part on:

identification of a connection between a first configuration item and a second configuration item of the CMDB, wherein the first configuration item corresponds to a first component of the electronic computing and communications system and the second configuration item corresponds to a second component of the electronic computing and communications system; and identification of an IP address and at least one port of each of the first component and the second component based on information associated with the first configuration item and the second configuration item, respectively, wherein the first access table record indicates the connection of the IP address and the at least one port of each of the first component and the second component.

3. The system of claim 1, wherein the routines to receive a request to access a database node, when executed, cause the system to:

identify, based on the request, an IP address of the first application node and an IP address and a port of the database node.

4. The system of claim 3, wherein the routines to determine that the access table record indicating that the first application node is authorized to access the database node is not stored in the access table, when executed, cause the system to:

query the access table for the access table record indicating that the IP address of the first application node is authorized to access the IP address of the database node at the port of the database node.

5. The system of claim 1, wherein the CMDB is populated with configuration items corresponding to respective application nodes of the application nodes and to respective database nodes of the database nodes based at least in part on a discovery operation to identify connections between the respective application nodes and the respective database nodes.

6. The system of claim 1, wherein the first application node executes application software associated with a first customer of the electronic computing and communications system and the database node is a database associated with a second customer of the electronic computing and communications system.

7. The system of claim 1, wherein the denied first request is not sent outside of the application server.

8. The system of claim 1, wherein the first application node has not sent a previous request, prior to the request, to access the database node.

9. The system of claim 1, wherein a subsequent request of the first application node to access the database node is denied without querying the CMDB.

10. A method for preventing unauthorized access of database nodes by application nodes within an electronic computing and communications system, the method comprising:

storing, in an application server, an access table of access table records generated based on information stored in a configuration management database (CMDB), wherein the access table records indicate that at least some of the application nodes are authorized to access at least some of the database nodes;

receiving a request to access a database node of the database nodes, wherein the request is sent from a first application node of the application nodes;

determining that a first access table record indicating that the first application node is authorized to access the database node is not stored in the access table;

denying the request responsive to determining that first access table record indicating that the first application node is authorized to access the database node is not stored in the access table;

receiving a second request to access the database node from a second application node of the application nodes of the application server;

determining, in the application server, that a second access table record indicating that the second application node is authorized to access the database node is not stored in the access table;

in response to determining that the second access table record indicating that the second application node is authorized to access the database node is not stored in the application server, querying the CMDB to determine whether an authorized connection between the second application node and the database node exists in the CMDB;

in response to the querying, receiving a response from the CMDB indicating that the authorized connection between the second application node and the database node exists in the CMDB;

updating the access table, based on the response from the CMDB, to indicate that the second application node is authorized to access the database node; and determining that the second access table record indicating that the second application node is authorized to access the database node is stored in the updated access table; and allowing the second request in response to determining that the second access table record indicating that the second application node is authorized to access the database node is stored in the updated access table.

11. The method of claim 10, wherein the access table records are based at least in part on:
    an identified connection between a first configuration item and a second configuration item of the CMDB, wherein the first configuration item corresponds to a first component of the electronic computing and communications system and the second configuration item corresponds to a second component of the electronic computing and communications system; and
    a respective identified IP address and at least one respective port of each of the first component and the second component based on information associated with the first configuration item and the second configuration item, wherein the first access table record indicates the connection of the IP address and the at least one port of each of the first component and the second component.

12. The method of claim 10, wherein receiving the request to access a database node comprises identifying, based on the request, an IP address of the first application node and an IP address and a port of the database node.

13. The method of claim 12, wherein determining that the first access table record indicating that the first application node is authorized to access the database node is stored in the access table comprises querying the access table for the first access table record indicating that the IP address of the first application node is authorized to access the IP address of the database node at the port of the database node.

14. The method of claim 10, wherein the first application node executes application software associated with a first customer of the electronic computing and communications system and the database node is a database associated with a second customer of the electronic computing and communications system.

15. A tangible non-transitory computer-readable storage medium, comprising processor-executable routines that, when executed by a processor, facilitate a performance of operations for preventing unauthorized access of database nodes by application nodes within an electronic computing and communications system, the operations comprising:
    storing, in an application server, an access table identifying a connection between a first application node of the application nodes and a database node of the database nodes within a configuration management database (CMDB), wherein the CMDB includes configuration items corresponding to the database nodes and the application nodes, wherein the access table is configured to allow the first application node to access the database node responsive to a request to access the database node sent from the first application node, wherein the application server is configured to deny requests to access the database node except when the requests are allowed via the access table;
    accessing, by the first application node, the database node responsive to receiving the request from the first application node and allowing the request based on the access table;
    in response to determining that a second access table record indicating that a second application node is authorized to access the database node is not stored in the application server, querying the CMDB to determine whether an authorized connection between the second application node and the database node exists in the CMDB;
    receiving a response from the CMDB indicating that an authorized connection between the second application node and the database node exists in the CMDB;
    updating the access table, based on the response from the CMDB, to indicate that the second application node is authorized to access the database node; and
    accessing, by the second application node, the database node responsive to receiving the second request and allowing the second request based on the updated access table.

16. The tangible non-transitory computer-readable storage medium of claim 15, wherein the access table identifying the connection between the first application node and the database node within the CMDB is generated by:
    identifying a first configuration item within the CMDB based on an IP address associated with the first application node, wherein the first configuration item corresponds to the first application node; and
    determining that the connection within the CMDB exists between the first configuration item and a second configuration item of the CMDB, wherein the second configuration item corresponds to the database node.

17. The tangible non-transitory computer-readable storage medium of claim 16, wherein the operations comprise:
    in response to the request to access the database node sent from the first application node, triggering an access table record of the connection between the first configuration item and the second configuration item to be generated; and
    storing the access table record in the access table.

18. The tangible non-transitory computer-readable storage medium of claim 17, wherein the access table record stored in the access table includes the IP address associated with the first application node, an IP address associated with the database node, and a port associated with the database node, wherein the request requests access to the IP address associated with the database node and the port associated with the database node.

19. The tangible non-transitory computer-readable storage medium of claim 15, wherein the CMDB is populated with configuration items corresponding to respective application nodes of the application nodes and to respective database nodes of the database nodes based at least in part on a discovery operation to identify connections between the respective application nodes and the respective database nodes.

20. The tangible non-transitory computer-readable storage medium of claim 15, the operations comprising:
    denying a second request to access the database node sent from a second application node, wherein the access table is not configured to permit the second application node to access the database node.

\* \* \* \* \*